United States Patent [19]

Terajima et al.

[11] 4,013,585

[45] * Mar. 22, 1977

[54] NITROHUMIC ACID-CONTAINING ADSORBENTS AND PROCESS FOR PRODUCING SAME

[75] Inventors: Kazuki Terajima; Shigeru Tomita; Yoshindo Matsuda, all of Tokyo; Keiji Abe, Omiya, all of Japan

[73] Assignee: Director-General of the Agency of Industrial Science and Technology, Tokyo, Japan

[ * ] Notice: The portion of the term of this patent subsequent to Aug. 19, 1992, has been disclaimed.

[22] Filed: July 18, 1974

[21] Appl. No.: 489,505

[30] Foreign Application Priority Data

July 19, 1973 Japan .............................. 48-81928

[52] U.S. Cl. .............................. 252/427; 252/426; 252/428; 252/430; 252/431 C; 210/38 B; 210/41; 210/DIG. 26

[51] Int. Cl.$^2$ ...................... C02B 1/14; C02B 1/52

[58] Field of Search .............. 252/426, 431 C, 428, 252/430, 427; 210/38

[56] References Cited

UNITED STATES PATENTS

| | | | |
|---|---|---|---|
| 1,966,553 | 7/1934 | Kropp | 252/426 |
| 2,029,966 | 2/1936 | Urbain et al. | 252/426 X |
| 2,340,111 | 1/1944 | D'Alelio | 252/426 X |
| 2,664,397 | 12/1953 | Hutchinson | 252/426 X |
| 3,900,422 | 8/1975 | Terajima et al. | 252/426 |

*Primary Examiner*—Patrick P. Garvin

[57] ABSTRACT

New adsorbents comprising granules of a mixture of nitrohumic acid and one or more proteins. These adsorbents are utilizable effectively for adsorbing heavy metals and oils contained in water. They are produced advantageously by either a process wherein a mixture of nitrohumic acid and a protein is kneaded with an aqueous solution of alkali and the kneaded mixture is first subjected to an acid treatment and then shaped into granules, or a process wherein nitrohumic acid and a protein are dissolved in an aqueous solution of alkali, the solution is acidified to form a precipitate and then the precipitate is separated and shaped into granules. The granular products thus obtained can be further improved in mechanical strength by means of a heat treatment.

19 Claims, No Drawings

NITROHUMIC ACID-CONTAINING ADSORBENTS AND PROCESS FOR PRODUCING SAME

BACKGROUND OF THE INVENTION

This invention relates to new nitrohumic acid-containing adsorbents possessing high mechanical strength and to a process for producing same.

The adsorbents are utilizable effectively for adsorbing heavy metals and oils contained in water.

It is known that nitrohumic acid exhibits high absorptivity for heavy metals dissolved and oils afloat in water. However, this compound is low in mechanical strength when shaped into granules and is finely pulverized under even slight pressure when charged into a packing tower. In addition, this compound has the disadvantage of partially dissolving when used for treating an alkaline or neutral solution, resulting in coloration of the solution in yellowish brown. If this compound is incorporated with a conventional binder to enhance mechanical strength, the excellent heavy metal adsorbability inherent to nitrohumic acid suffers. Therefore, nitrohumic acid has not yet had practical use as a heavy metal adsorbent for the treatment of waste effluents, notwithstanding the cheapness of this compound.

We have found that when a carboxyl group-containing polymeric compound such as carboxymethylcellulose or alginic acid is added as a binder to nitrohumic acid and the mixture is shaped into granules, an adsorbent of good quality is obtained, which is improved in mechanical strength while retaining the good adsorptivity inherent to nitrohumic acid.

As the result of many researches made on adsorptivity of such adsorbents under various conditions, however, it has now been found that adsorptivity of these adsorbents for heavy metals, especially mercury is seriously disturbed when a significant amount of chlorine ion is present. Thus, a certain type of improvement will be necessary for such adsorbents when they are used for the treatment of aqueous effluents containing heavy metal ions together with chlorine ion.

BRIEF SUMMARY OF THE INVENTION

Accordingly, it is an object of this invention to provide a nitrohumic acid-containing adsorbent which is insoluble in water and has high mechanical strength.

It is another object of this invention to provide a new adsorbent comprising a shaped granular article of a mixture of nitrohumic acid and a specific class of binders.

It is still another object of this invention to provide a nitrohumic acid-containing adsorbent which exhibits good adsorptivity for heavy metals, especially mercury, coexistent with chlorine ion.

It is further object of this invention to provide a process for producing in good efficiency a nitrohumic acid-containing adsorbent which is insoluble in water and has high mechanical strength.

It is still further object of this invention to provide a process for homogeneously mixing nitrohumic acid with a given binder to produce a adsorbent in granular form.

Other objects, features and advantages of this invention will be apparent from the following description.

DETAILED DESCRIPTION OF THE INVENTION

It has now been found that when one or more proteins are added as a binder to nitrohumic acid and the mixture is shaped into granules, an adsorbent of good quality is obtained, which is remarkably improved in mechanical strength while retaining the good adsorptivity inherent to nitrohumic acid.

It has also been found that adsorptivity of this adsorbent for heavy metals is not disturbed even in the co-existence of chlorine ion.

The adsorbent of this invention comprises a granular shaped article of a mixture of nitrohumic acid and one or more proteins. Nitrohumic acid utilizable as the main ingredient of the heavy metal adsorbent of this invention is a known substance and can be prepared, for example, by oxidation of coal with nitric acid.

Illustrative of proteins utilizable as binder for the adsorbent of this invention are petroleum protein, yeasts such as pulp waste liquor yeasts and common yeasts, microorganism body such as chlorella, skin powder and hair of animals such as cow, horse, pig, etc., human hair, wool, fish powder, casein and gelatin. These substances can be used singly or in a mixture of at least two.

These proteins serve to impart high mechanical strength to the adsorbent products when used as a binder for nitrohumic acid. Moreover, functional groups contained in such proteins, such as carboxyl groups, imidazole groups and amino groups, serve to adsorb metal ions through ionic linkage or chelate linkage. Thus, the excellent adsorptivity inherent to nitrohumic acid is not adversely affected and lowering of heavy metal-adsorptivity as seen in the case of using nitrohumic acid alone in the co-existence of chlorine ion is rather avoided.

As a whole, these proteins rather serve to enhance the heavy metal-adsorbing function of the product or exhibit a peculiar action of compensating for a reduction in the activity of nitrohumic acid usually observed in heat treatments. The proteins are used in an amount of 5 – 50 parts by weight, preferably 10 – 35 parts by weight per 100 parts by weight of nitrohumic acid.

In accordance with one embodiment of this invention, the adsorbent can be prepared advantageously according to the following method.

At the outset, nitrohumic acid is mixed with the protein and the mixture is kneaded with an aqueous solution of alkali. The kneaded mixture can be first shaped into granules in a conventional manner and then subjected to an acid treatment for insolubilization, or, alternatively, first subjected to an acid treatment for insolubilization and then shaped into granules. In this method, the starting materials, i.e., nitrohumic acid may be in either free acid form or soluble salt form such as the sodium salt or potassium salt thereof. The aqueous solution of alkali used in the kneading treatment is preferably an aqueous solution of sodium hydroxide or potassium hydroxide, but ammonia water may be used. 5 – 30 parts by weight of alkali and 100 – 1000 parts by weight, preferably 300 – 500 parts by weight of water are used for 100 parts by weight of nitrohumic acid. The kneading treatment is carried out at a temperature ranging from room temperature to 70° C for a period of time varying between 30 and 120 minutes. As an acid utilizable for insolubilization of the kneaded mixture, there can be mentioned hydrochloric acid, nitric acid, sulfuric acid, phosphoric acid and the like inorganic acids. Methods for shaping the kneaded mixture into granules include those wherein the mixture is shaped into pellets and, if desired, washed with water and dried and those wherein the mixture is dried as is to lumps and crushed into granules of a desired granular size. In accordance with another embodiment of this invention, the adsorbent can be prepared in the following manner:

nitrohumic acid and the protein are dissolved in an aqueous solution of alkali and an acid is then added to the solution to co-precipitate the nitrohumic acid and the protein. The precipitate is separated from the solution and then shaped into granules. An aqueous solution of sodium hydroxide or potassium hydroxide containing alkali in an amount of 5–30 parts by weight per 100 parts by weight of nitrohumic acid in at least 1000 parts by weight of water is preferable as an aqueous solution of alkali used in this case, but ammonia water may also be used. Examples of acids utilizable for the formation of the co-precipitate include inorganic acids such as hydrochloric acid, nitric acid, sulfuric acid, phosphoric acid and the like.

The precipitate formed by the addition of an acid is separated from the solution by means of filtration or centrifugal separation, dried and recovered as solid lumps, which are then crushed into granules of an adequate size.

In this invention, the granular article of a mixture of nitrohumic acid and the protein obtained by either of the above-mentioned methods can be treated with an aqueous solution containing an alkaline earth metal ion, such as calcium ion, barium ion or magnesium ion, whereby the free acid residues in the nitrohumic acid and the binder are converted into the alkali earth metal salt groups to enhance insolubility. The adsorbent converted into the calcium salt has such a technical merit that it exhibits enhanced adsorptivity for heavy metal ions in the treatment of waste water containing heavy metals and serves to inhibit lowering of the pH value of a solution to be treated.

The granular article can also be heated for 0.5–5 hours in open air or in an inert gas atmosphere at 120°–200° C, preferably at 130°–180° C, thereby enhancing insolubilization and strength.

According to this invention, the adsorbent may be incorporated, if necessary, a water-soluble high molecular substance as a reinforcing material to enhance strength of the adsorbent. Preferable examples of such high molecular substance include carboxyl group-containing ones such as carboxymethylcellulose, carboxymethylstarch, alginic acid, pectic acid, polyacrylamide and polyacrylic acid as well as polyvinyl alcohol. These high molecular substance is usually employed in an amount of 5–50 parts by weight per 100 parts by weight of nitrohumic acid.

An inorganic filler in an amount of 10–50 parts by weight per 100 parts by weight of nitrohumic acid may optionally be added to the adsorbent of this invention. Examples of the inorganic filler include sand, rock powder, glass powder, Shirasu (vitreous volcanic ash), silica, loam, clay and talc. These fillers are added for the purpose of enhancing strength and adjusting the specific gravity of the adsorbent. The filler-containing adsorbent which is increased in specific gravity is advantageously used especially for precipitating waste oils afloat in water.

When the adsorbent of this invention is brought into contact with an aqueous solution containing heavy metals by a suitable means, the adsorbent adsorbs the heavy metals contained in the solution, thus serving to eliminate heavy metals effectively from the solution. For example, heavy metals such as cadmium, mercury, lead, chromium and copper can be eliminated at an efficiency of 95% or higher.

The adsorbent thus used for elimination of heavy metals can easily be regenerated by washing it with a 0.1 – 1.0-N solution of a strong mineral acid such as hydrochloric acid or sulfuric acid.

Unlike nitrohumic acid itself, the heavy metal adsorbent of this invention possesses high abrasion-resistance and compression strength and is not pulverized when charged under pressure into a packing tower. For example, a load required for crushing a granule having a size of about 25 mesh is 0.1 Kg or less in the case of the product consisting of nitrohumic acid alone but is 0.5–1.0 Kg in the case of the product containing a binder of this invention. In addition, the adsorbent by virtue of its use as a binder of the protein capable per se of heavy metal adsorption has the advantage that its heavy metal adsorptivity is almost equivalent to nitrohumic acid alone. In the case of the product consisting of nitrohumic acid alone or the product containing a binder other than the protein, for example, the product containing carboxymethylcellulose, adsorptivity for heavy metals, especially mercury is seriously disturbed in the co-existence of a large amount of chlorine ion. In contrast to this, the product of this invention exhibits good adsorptivity for heavy metals in the co-existence of chlorine ion, by virtue of the protein contained in the product, which eliminates disturbance of chlorine ion.

The adsorbent of this invention effectively adsorbs oils when brought into contact with oils dispersed or afloat in water. In this case, the adsorbent the specific gravity of which is increased to more than 1 sinks while adsorbing oils. The sunk precipitate keeps the adsorbed oils for a long period of time and so does not cause any secondary pollution by liberation of oils.

This invention will be understood more readily with reference to the following examples; however, these examples are intended to illustrate the invention and are not to be construed as limiting the scope of the invention.

EXAMPLE 1

(I) Preparation of adsorbent:

Nitrohumic acid, a protein and a water-soluble high molecular substance in a proportion as shown in Table 1 were well mixed and the resulting mixture was added to 3 liters of water having 20 g. of sodium hydroxide dissolved therein. The whole was stirred at 60° C for one hour to dissolve the mixture in water. To this solution were added 50 ml of conc. hydrochloric acid to form a precipitate, which was then air dried and crushed into granules to prepare Samples A-1 – A-7. The resulting granules were subjected to a heat treatment conducted at 160° C for 2 hours to obtain Samples B-1 – B-7.

(II) Conversion of the adsorbent into its salt form:

The adsorbent in acid form obtained according to the foregoing step (I) was dipped for 5 hours into an aqueous solution of 1-mol calcium acetate to convert the acid form into a calcium salt thereof (Sample C). The resulting adsorbent was then heated at 160° C for 2 hours to prepare Sample D.

(III) Treatment of an aqueous solution containing heavy metals:

The individual samples obtained as above were conditioned to have a granularity of 16–25 mesh prior to using them for the treatment of an aqueous solution containing a heavy metal. A method for treating the aqueous solution comprised adding 1 g. of a sample of the adsorbent to one liter of an aqueous solution the pH value of which had been adjusted to 6, and then shaking the solution for 20 hours. After this treatment, the adsorbent was separated and the resulting supernatant liquid was measured by the atomic absorptiometric method to determine the concentration of a heavy metal in the liquid for obtaining the rate of removal. The initial concentration of heavy metals in the solution used was $2 \times 10^{-4}$ mol/liter.

The results of the above experiments are shown in Table I wherein NHA stands for nitrohumic acid.

Table 1

| Sample No. | Composition of Adsorbent (parts by weight) | | | Rate of Removal for Heavy Metals | | |
|---|---|---|---|---|---|---|
| | NHA | Protein[*1] | Polymer[*2] | $Cd^{++}$ | $Hg^{++}$ | $Pb^{++}$ |
| A1 | 100 | 30 | 0 | 97.3 | 97.8 | 98.9 |
| B1 | 100 | 30 | 0 | 96.1 | 98.6 | 97.4 |
| A2 | 100 | 15 | 5 | 94.4 | 95.3 | 97.6 |
| B2 | 100 | 15 | 5 | 90.2 | 93.8 | 94.9 |
| A3 | 100 | 15 | 15 | 93.5 | 96.8 | 98.9 |
| B3 | 100 | 15 | 15 | 88.2 | 94.3 | 97.5 |
| A4 | 100 | 15 | 15 | 92.4 | 97.7 | 99.0 |
| B4 | 100 | 15 | 15 | 89.4 | 95.2 | 97.7 |
| A5 | 100 | 20 | 20 | 93.1 | 96.8 | 98.7 |
| B5 | 100 | 20 | 20 | 90.2 | 96.8 | 93.4 |
| A6 | 100 | 30 | 20 | 95.9 | 93.9 | 98.8 |
| B6 | 100 | 30 | 20 | 90.2 | 97.2 | 97.0 |
| A7 | 100 | 5 | 20 | 91.8 | 94.8 | 99.2 |
| B7 | 100 | 5 | 20 | 88.9 | 97.7 | 96.2 |
| C | 100 | 30 | 20 | 97.8 | 98.9 | 99.3 |
| D | 100 | 30 | 20 | 95.1 | 97.4 | 98.8 |

Notes:
[*1]Petroleum protein was used in Sample Nos. A-1 to A-4, B-1 to B-4, C and D. Pulp waste liquor yeasts were used in Sample Nos. A-5 and B-5. Cow leather powder was used in Sample Nos. A-6 and B-6. Wool was used in Sample Nos. A-7 and B-7.
[*2]Polyacrylamide was used in Sample Nos. A-2 and B-2. Alginic acid was used in Sample Nos. A-3 and B-3. Carboxymethylcellulose was used in Sample Nos. A-4 to A-7, B-4 to B-7, C and D.

EXAMPLE 2

(I) Preparation of adsorbent:

Nitrohumic acid, a protein and a water-soluble high molecular substance in a proportion as shown in the foregoing Table 1 were well mixed and the resulting mixture was added to 350 ml of water having 20 g. of sodium hydroxide dissolved therein. The whole was kneaded at 60° C for one hour by the aid of a kneader. The kneaded mixture was then extruded through an extruder into pellets.

After drying with blast, the pellets were dipped into 3-N hydrochloric acid to prepare an adsorbent in acid form, which was then washed with water to obtain Samples A'-1 to A'-7. In this acid treatment, it was found that the concentration of hydrochloric acid was preferably between 1-N and 3-N, the dipping time was preferably longer than 3 hours and the treating temperature was preferably between room temperature to 50° C.

The adsorbent in acid form was washed with water and then subjected to a heat treatment conducted at 160° C for 2 hours to prepare Samples B'-1 to B'-7.

(II) Conversion of the adsorbent into its salt form:

The adsorbent in acid form obtained according to the foregoing step (I) was dipped for 5 hours into an aqueous solution of 1-mol calcium acetate to convert the acid form into a calcium salt thereof (Sample C'). The resulting adsorbent was then heated at 160° C for 2 hours to prepare Sample D'.

(III) Treatment of an aqueous solution containing heavy metals:

The individual samples obtained as above were conditioned to have a granularity of 16–25 mesh prior to using them for the treatment of an aqueous solution containing a heavy metal. A method for treating the aqueous solution comprised adding to the solution adjusted to have a pH value of 6 the adsorbent in an amount of 1 g. per liter of the solution and shaking the solution for 20 hours. After this treatment, the adsorbent was separated and the resulting supernatant liquid was measured by the atomic absorptiometric method to determine the concentration of heavy metals in the liquid for obtaining the rate of removal. The initial concentration of heavy metals in the solution used was $2 \times 10^{-4}$ mol/liter.

As the results of experiments, it was found that Samples A'-1 to A'-7, B'-1 to B'-7, C' and D' obtained in Example 2 exhibit almost equivalent adsorptivity for heavy metals to Samples A-1 to A-7, B-1 to B-7, C and D obtained in Example 1. However, the adsorbents obtained in this Example were found somewhat inferior in mechanical strength to the adsorbents obtained in Example 1.

EXAMPLE 3

Using samples obtained as described in Example 1-(I), an aqueous solution of a mercury salt containing 6000 ppm of sodium chloride was treated in a manner similar to that described in Example 1-(III). The results were as shown in Table II.

Table II

| Sample No. | Composition of Adsorbent (parts by weight) | | | Rate of Removal for Heavy Metals (%) |
|---|---|---|---|---|
| | NHA | Protein | Polymer | |
| E1 | 100 | 0 | 25[*5] | 24.41 |
| E2 | 100 | 30[*1] | 0 | 87.75 |
| E3 | 100 | 30[*2] | 0 | 84.36 |
| E4 | 100 | 20[*3] | 20[*5] | 85.78 |
| E5 | 100 | 5[*4] | 20[*5] | 89.27 |
| E6 | 100 | 5[*4] | 5[*6] | 92.41 |

Notes:
[*1]Petroleum protein
[*2]Pulp waste liquor yeasts
[*3]Cow leather powder
[*4]Wool
[*5]Carboxymethylcellulose
[*6]Polyacrylamide

EXAMPLE 4

Nitrohumic acid, petroleum protein, sand and polyacrylamide were mixed in a proportion as shown in Table III. To this mixture were added 300 ml of water containing 15 g. of sodium hydroxide, and the whole was kneaded for 30 minutes in a kneader. The kneaded mixture was then shaped into pellets through an extruder. After drying, the pellets were dipped into 3-N hydrochloric acid to obtain an adsorbent in acid form which was then washed with water, dried and used for adsorption tests.

The adsorption tests were carried out as follows: In a 1-liter beaker were placed 400 ml of an artificial brine, into which 1 g. of heavy oil was then dispersed. One gram of the product as obtained above and conditioned to have a granularity of 16–25 mesh was dispersed as adsorbent into the brine. Within 2–3 minutes after dispersing, the adsorbent precipitated while accompanying the heavy oil. After laspe of one hour, any residual oil in the brine was measured to obtain the rate of removing oil. The results were as shown in Table III.

Table III

| Test Nos. | NHA | Protein | Water-soluble high molecular substance | Sand | Rate of removing oil (%) |
|---|---|---|---|---|---|
| 1 | 100 | 0 | 5 | 20 | 94.1 |
| 2 | 100 | 20 | 5 | 20 | 96.4 |
| 3 | 100 | 20 | 5 | 40 | 91.6 |
| 4 | 100 | 30 | 0 | 20 | 95.3 |

What is claimed is:

1. An adsorbent which comprises a mixture of at least one protein and a compound selected from the group consisting of nitrohumic acid and a water-insoluble salt thereof, wherein said protein is selected from the group consisting of petroleum proteins, yeasts, animal leather, animal hair and mixtures thereof and is present in an amount of about 5–50 parts by weight per 100 parts by weight of said nitrohumic acid.

2. An adsorbent according to claim 1 wherein a water-soluble high molecular substance selected from the group consisting of carboxymethylcellulose, carboxymethylstarch, alginic acid, pectic acid, polyacrylamide, polyacrylic acid and polyvinyl alcohol in an amount of 5–50 parts by weight per 100 parts by weight of said nitrohumic acid is used as a reinforcing agent.

3. An adsorbent according to claim 2 wherein said water-soluble high molecular substance is selected from the group consisting of carboxymethylcellulose, alginic acid and polyacrylamide.

4. An adsorbent according to claim 1 wherein an inorganic filler is present in an amount of 10–50 parts by weight per 100 parts by weight of said nitrohumic acid.

5. An adsorbent according to claim 2 wherein an inorganic filler is present in an amount of 10–50 parts by weight per 100 parts by weight of said nitrohumic acid.

6. A process for producing an adsorbent, which comprises the steps of (A) kneading a mixture of nitrohumic acid and at least one protein selected from the group consisting of petroleum proteins, yeasts, animal leather, animal hair and mixtures thereof, said protein being present in an amount of about 5–50 parts by weight per 100 parts by weight of said nitrohumic acid, with an aqueous alkaline solution, (B) shaping the kneaded mixture into granules and (C) subjecting the thusly shaped granules to an inorganic acid to insolubilize said granules.

7. A process for producing an adsorbent, which comprises the steps of (A) dissolving nitrohumic acid and at least one protein in an aqueous alkaline solution, said protein being selected from the group consisting of petroleum proteins, yeasts, animal leather, animal hair and mixtures thereof, and being present in an amount of about 5–50 parts by weight per 100 parts by weight of said nitrohumic acid, acidifying said aqueous solution with an inorganic acid to form a precipitate, (B) separating said precipitate and (C) shaping said separated precipitate into granules.

8. A process according to claim 6 wherein the resulting granules are treated with an aqueous solution containing an alkaline earth metal salt to convert the acid form into the corresponding salt thereof.

9. A process according to claim 6 wherein the resulting granular product is heated for 0.5–5 hours in an atmosphere selected from the group consisting of air and inert gas at 120°–200° C.

10. A process according to claim 7 wherein the resulting granules are treated with an aqueous solution containing an alkaline earth metal salt to convert the acid form into the corresponding salt thereof.

11. A process according to claim 7 wherein the resulting granular product is heated for 0.5–5 hours in an atmosphere selected from the group consisting of air and inert gas at 120°–200° C.

12. A process according to claim 6, wherein the mixture of nitrohumic acid and at least one protein is subjected to said inorganic acid before being shaped into granules.

13. A process according to claim 12, wherein the resulting granules are treated with an aqueous solution containing an alkaline earth metal salt to convert the acid form into the corresponding salt thereof.

14. A process according to claim 12, wherein the resulting granular product is heated for 0.5–5 hours in an atmosphere selected from the group consisting of air and inert gas at 120°–200° C.

15. An adsorbent for removing a substance selected from the group consisting of oil and heavy metal ions from water through contact with the adsorbent, which adsorbent comprises a granular mixture of at least one protein and a compound selected from the group consisting of nitrohumic acid and a water-insoluble salt thereof, wherein said protein is selected from the group consisting of petroleum proteins, yeasts, animal leather, animal hair and mixtures thereof and is present in an amount of about 5–50 parts by weight per 100 parts by weight of said nitrohumic acid.

16. An adsorbent according to claim 1 wherein said protein is a petroleum protein.

17. An adsorbent according to claim 1 wherein said protein is a yeast.

18. An adsorbent according to claim 1 wherein said protein is an animal leather.

19. An adsorbent according to claim 1 wherein said protein is an animal hair.

* * * * *